Patented July 14, 1953

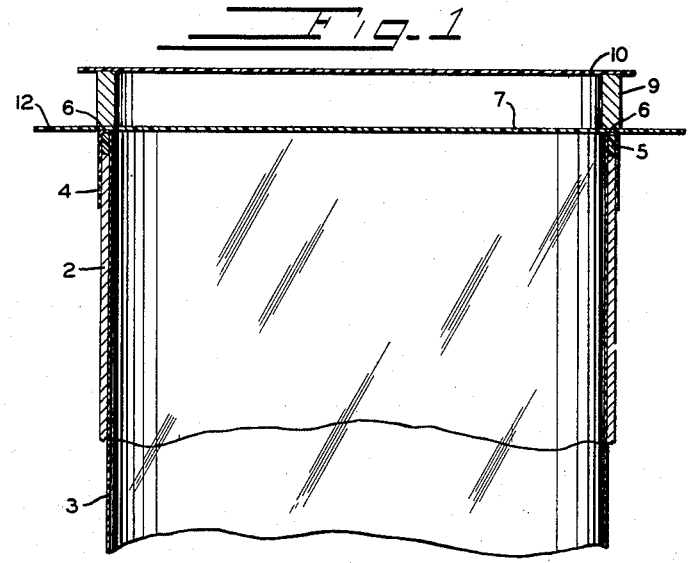
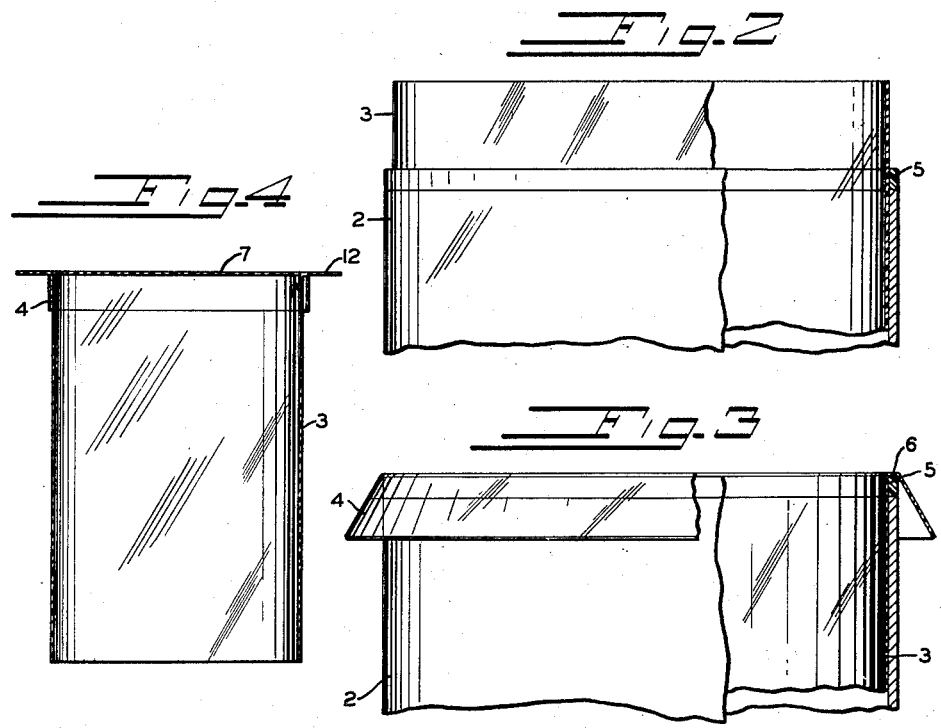

2,645,591

UNITED STATES PATENT OFFICE 2,645,591

METHOD OF BONDING AN END CLOSURE TO A THERMOPLASTIC BAG

Irvin Makrauer, Cincinnati, Ohio, assignor to Sydney-Thomas Corporation, Cincinnati, Ohio, a corporation of Ohio Application October 25, 1950, Serial No. 191,995

10 Claims. (Cl. 154—83)

This invention relates to the method of making thin, flexible thermoplastic composition bags, and it particularly pertains to the manufacture of bags from tubular sections of heat sealing thermoplastic compositions having one end laterally deformed to increase the wall thickness at that end of the sections for bonding thereto an end closure of heat sealing thermoplastic material. The thickened end of the bag section provides a wider surface area of contact with the end closure and makes available in that area more material than would be provided by the mere line contact between the non-thickened wall of the bag section and the end closure and the material available along that line, thereby insuring a continuous and uninterrupted bond being effected between the contacting portions around the entire end of the bag.

The bag is useful either alone or as a lining for metal and non-metal containers to provide a moisture-proof envelope for goods to be packaged therein. The end closure may be of greater cross-section than the bag section to provide a bottom of larger area than said bag section. When the bag is used for a lining, this provides a surrounding margin or flange for securing the lining to the container. The end opposite the end closure can be closed in any conventional manner after the bag is filled with goods to be placed therein. Ordinarily this end is closed by bringing the opposite wall portions into contact and heat sealing them transversely.

Heretofore, both ends of the bag or lining have been sealed by bringing the opposite wall portions at each end of the bag into contact, and then heat sealing the ends transversely of the bag. This method, however, decreases the holding capacity of the bag and does not provide, where the bag is used for liners, any means thereon for readily attaching it to the container.

Accordingly, the principal object of my invention is to provide a method for making a bag having an end closure effectively bonded and sealed thereto.

Another object of the invention is to provide a method for making a bag having an end closure sealed thereto which selectively may be of the same or greater cross-sectional area than the bag.

Another object of the invention is to provide a method for a bag having an edge at one end thicker than the normal thickness of its wall to provide a wide contacting surface for bonding the end closure thereto.

Another object of the invention is to provide a method for making a bag having ample wall material provided at one end for filling the joint seam resulting from heat sealing an end closure to the bag.

Further objects, and objects relating to details of construction and economies of operation, will readily appear from the detailed description to follow. In one instance I have accomplished the objects of my invention by the method set forth in the following specification. My invention is clearly defined and pointed out in the appended claims. A structure constituting a preferred embodiment of my invention and its method of manufacture is illustrated in the accompanying drawings, forming a part of this specification, in which:

Fig. 1 is a cross-sectional view of apparatus for making a bag embodying my invention and a bag in its final stage of manufacture.

Figs. 2 and 3 are views showing preliminary stages in retroverting one end of a tubular bag section around the end of a tubular mandrel.

Fig. 4 is a cross-sectional view showing a completed bag embodying my invention.

Generally described, the invention comprises a method for fabricating a bag from a tube section of thin, flexible heat sealing thermoplastic material having an end closure bonded to one end. This tube is of any desired length and cross-sectional conformation, but preferably cylindrical. One end is deformed, such as by being retroverted, either inwardly or outwardly to increase the wall thickness of the edge at one end of the tube section. A closure, also of heat sealing thermoplastic material, is placed over that end of the tube section which is retroverted, pressed into contact therewith, and then heated along the contacting portions to coalesce them together into bonded union. The enclosure is of somewhat greater cross-sectional area than the tube section, and there will be a flange or margin of substantial width extending circumferentially around the end of the bag. This surrounding margin or flange may be easily removed at the time that the closure is heat sealed to the end of the tube section in order to have the peripheral edge of the closure flush with the wall of the bag, or it may be retained as a permanent part of the bag. Retention of the margin provides a bottom end of larger cross-sectional area which is desirable for supporting the bag in vertical position while it is being filled, and it is also desirable, if the bag is used as a package liner, for fixing the bag liner to the container in which it is to be inserted. But whether or not the margin of the bag be retained or removed, the deformed end wall provides a wider area of contact between the end closure and the end of the tube section. Moreover, more material is provided for the welded seam in bonding the contacting portions than would be available with the end of the bag section of its normal thickness. Accordingly, there is less likelihood of an imperfect bond or of any interrupted or unsealed spaces such as might result if this excess material were not provided by the deformed end of the tube to which the closure is to be heat sealed.

The bag is formed by fitting a tubular length of bag material to a tubular mandrel which is of a cross-section conforming to that of the tubular length of bag material, and bending one end of said length of the bag material over the end of the mandrel. If the length of bag material is placed on the outside of the mandrel and its end is bent inwardly over the end of the mandrel, the length of bag material is made of somewhat larger cross-section than the mandrel to fit thereover; whereas if said length is placed inside the mandrel and its end is bent outwardly over the end of the mandrel, it will be of somewhat less cross-section than the mandrel to fit the inside wall thereof. The end of the mandrel is provided with a nose made of some material that is somewhat compressible to serve as a platen against which the parts to be heat sealed are pressed during the heat sealing treatment.

An end closure in the form of a thin sheet is placed over the retroverted end of the length of bag material on the end of the mandrel to abut against that portion resting on the nose of the mandrel, and then a platen member in the form of a ring of about the same diameter as the length of bag material is positioned to be moved and pressed against the end closure to hold it snugly against the end of the tube length on the mandrel. A buffer strip may be interposed between the ring and a pressure member. The platen ring is heated to a temperature sufficient to soften the abutting parts of the length of bag material and the closure for bonding them together. With bag material made from polyethylene or cellulose material, the temperature for heat treating the bag material will be about 250° F. or about the softening point of the material. After the heat treatment, the platen ring is raised to permit the completed bag to be removed from the mandrel which is held by any suitable support. It will, of course, be understood that all or any of the steps in placing the length of bag section on the mandrel, retroverting one end thereof, placing the end closure in place for its attachment to the section of bag material, and removing the completed bag from the mandrel may all be done by hand or by automatic machinery. The invention is not limited to any particular apparatus for carrying out the process.

Referring specifically to the drawings in which like numerals are used to designate like parts, numeral 2 is a tube of any material which is strong and durable enough to serve as a mandrel for holding a tubular length 3 of heat sealing bag material that is fitted to it for having one end 4 of bag material retroverted. The mandrel can be of metal with a top end or nose 5 formed of less rigid material, such as rubber, molded phenol-formaldehyde resin, and the like. The mandrel is of the same cross-sectional conformation as is the length of bag material, but preferably cylindrical, and a length of bag material of slightly less diameter than the inside diameter of the mandrel is placed within the mandrel with its top end projecting for being retroverted to present an end wall surface portion 6 that is not only in excess of the normal thickness of the wall of the bag material but also provides an abundant supply of material at this surface portion 6 for effecting the bond with a closure piece 7 that is placed over the retroverted end of the bag material in the mandrel to abut this surface portion 6.

The closure piece is pressed against the end of the bag section by a platen in the form of ring 9 to be in end to end alignment with the wall of the bag section. The buffer sheet 10 of the same material as that for forming the end or nose 5 of the mandrel may be interposed between the top of the ring and a presser means (not shown). The platen ring is heated by any suitable means, such as by an electrical resistance device (not shown) to soften the bag material, both the end closure and the tubular length, at their points of contact for coalescing the parts together. The portion 6 is of substantial width, at least double the normal thickness of the wall of the length of bag material. Accordingly, surface contact, in contrast to mere line contact, is obtained at the juncture area so that a continuous and uninterrupted bonding seam is attained around the entire circumference of the bag section without any openings or breaks that might result if the end closure was sealed to the wall of the bag without any widened end being provided. Moreover, the widened surface area at the end of the bag provides a greater supply of material at this junction point for the coalesced seam than if the end of the bag section were of its normal width.

The bag material is so thin and flexible that it has been deemed utterly impossible to bond a closure to the end thereof with an effective and satisfactory bonding seam, and accordingly, the practice of sealing either or both ends of the bag material has, heretofore, been confined entirely to bringing opposite portions of the surrounding wall of the section of bag material together, and then heat sealing them along a transverse line. This, of course, reduces the size of the bag, and even then does not provide excess bonding material along the bonding line.

The bag material may be made from vinyl resins, such as ethylene derivatives and the like, which have been polymerized to produce a thermoplastic with a softening point from about 240 to 280° F. The closure may be sealed to the end of the tubular length of the bag material by heating to about 250° F. to contacting portions which are pressed together between the end of the mandrel and the platen.

The end closure piece 7 is substantially larger in cross-section than is the tubular length of bag material, and there is a resulting free margin or flange 12 projecting beyond the joint seam between the parts. At the time that the contacting portions of the abutting parts are softened in heat sealing them, this margin or flange can be very easily removed, if desired, so that the peripheral edge of the end closure will be flush with the wall of the length of bag material. Alternatively, this flange or margin may be left in place attached to the bag for providing a bottom for the bag of larger area than if said flange or margin were removed. Moreover, this flange or margin is also effectively used for fixing the bag to a container in which it is to be inserted as a lining. If the surrounding margin or flange 12 of the closure be removed, the retroverted end 4 beyond the joint will also be removed at the same time. However, should the surrounding margin or flange be retained and not removed, the retroverted end is also retained on the completed bag.

Bags produced by this novel method are the subject of my application Serial No. 191,994, filed October 25, 1950 (now abandoned).

From the foregoing description, the construction of the bag and the method of fabricating it are clearly apparent. The bag can be used alone or as a liner for a more durable package, but, whether used alone or as a liner, the opposite end of the bag can be sealed in any conventional manner after being filled with whatever contents are to be placed therein.

I am aware that there may be various changes in details of construction and method of fabricating the bag without departing from the spirit of my invention, and, therefore, I claim my invention broadly as indicated by the appended claims.

Having thus described my invention what I claim as new and useful and desire to secure by United States Letters Patent, is:

1. A method of fabricating bags as articles of manufacture having one end closed and one end open comprising forming a tubular section of thin, flexible thermoplastic material open at both ends, then bending the wall portion laterally at one end of the tubular section to widen the edge surface of the wall of the section, and heat sealing an end closure to the laterally bent portion of the end of the tubular section.

2. A method as set forth in claim 1 in which the laterally bent portion is formed by retroverting the wall portion of the end of said section.

3. A method of fabricating bags as articles of manufacture having one end closed and one end open comprising forming a tubular section of thin, flexible thermoplastic material open at both ends, then forming a widened edge surface on one end of said tubular section by bending the wall portion of said tubular section laterally, and heat sealing an end closure to the widened edge surface of the tubular section.

4. A method of fabricating bags as articles of manufacture having one end closed and one end open comprising fitting a tubular body, open at both ends, of thin, flexible thermoplastic material to a tubular mandrel with one end of the tubular body projecting beyond the end of the mandrel, there deforming the wall portion of the projecting end of the tubular body to increase the thickness of the wall of said body, placing a relatively thin, flexible thermoplastic closure on the deformed end of the tubular body, and heat treating the contacting portions of the closure and the tubular body for bonding them together.

5. A method set forth in claim 4 in which the thermoplastic closure is of greater cross-section than the tubular body to provide a surrounding free margin extending radially beyond the wall of said tubular body.

6. A method as set forth in claim 4 in which the wall portion of the projecting end of the tubular body is deformed by retroverting it.

7. A method of fabricating bags as articles of manufacture having one end closed and one end open comprising fitting a tubular body, open at both ends, of thin, flexible thermoplastic material to a tubular mandrel with one end of the tubular body projecting beyond the end of the mandrel, retroverting the wall portion of the projecting end of the tubular body over the end of the mandrel to seat the intervening bent portion of the tubular body on the end of the mandrel, contacting a relatively thin, flexible thermoplastic closure with the intervening bent portion of the tubular body on the end of the mandrel, and heat treating the contacting portions of the closure and the tubular body for bonding them together.

8. A method of fabricating bags as set forth in claim 7 in which the closure is of greater cross-section than the tubular body to provide a surrounding free margin extending radially beyond the wall of said tubular body.

9. A method of fabricating bags as articles of manufacture having one end closed and one end open comprising forming a tubular body, open at both ends, of thin, flexible thermoplastic material, then bending the wall portion laterally at one end of the tubular body to provide a laterally extended end portion, and heat sealing a thin, flexible end closure to the laterally extended end portion of the tubular body.

10. The method of claim 9 in which the end closure is of substantially greater area than the diameter of tubular body to provide a surrounding free margin extending radially beyond the sealed joint at the lateral bent portion between said tubular body and end closure.

IRVIN MAKRAUER.

References Cited in the file of this patent
UNITED STATES PATENTS

| Number | Name | Date |
|---|---|---|
| 1,563,063 | Bartlett | Nov. 24, 1925 |
| 2,285,220 | Morrell | June 2, 1942 |
| 2,393,347 | Stuart et al. | Jan. 22, 1946 |
| 2,402,943 | Bogoslowsky | July 2, 1946 |